No. 816,721. PATENTED APR. 3, 1906.
J. L. FRAZIER.
SPLICING SOCKET FOR CABLES.
APPLICATION FILED JAN. 17, 1905.
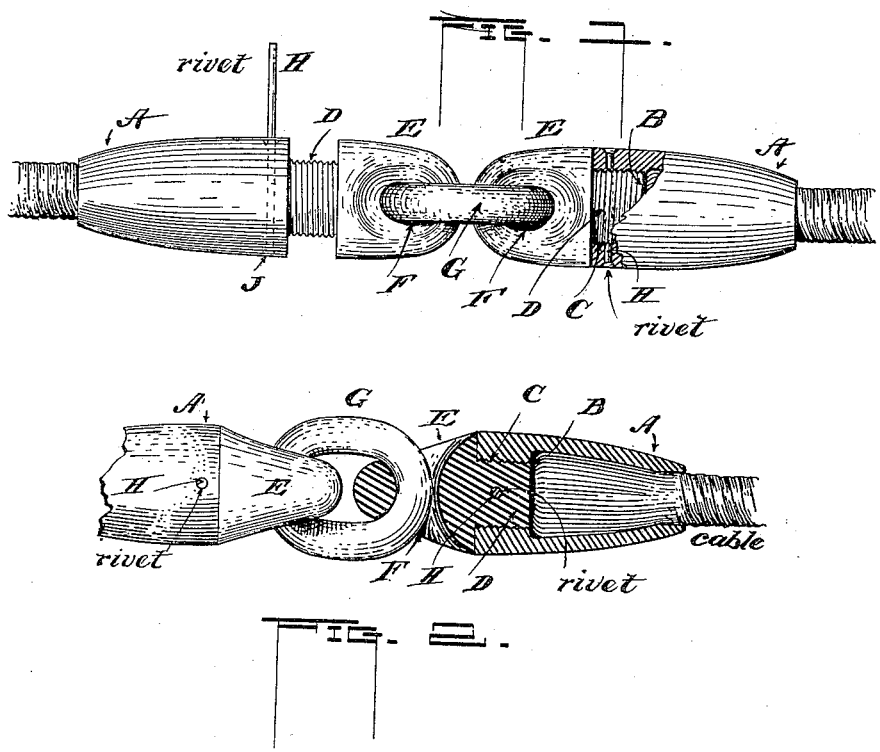
Witnesses:-
Inventor:
James L. Frazier,
By L. M. Thurlow,
Atty.

UNITED STATES PATENT OFFICE.

JAMES L. FRAZIER, OF PEORIA, ILLINOIS.

SPLICING-SOCKET FOR CABLES.

No. 816,721.  Specification of Letters Patent.  Patented April 3, 1906.

Application filed January 17, 1905. Serial No. 241,436.

*To all whom it may concern:*

Be it known that I, JAMES L. FRAZIER, a citizen of the United States, residing at Peoria, in the county of Peoria and State of Illinois, have invented certain new and useful Improvements in Splicing-Sockets for Cables; and I do hereby declare that the following is a full, clear, and exact description of the invention, which will enable others skilled in the art to which it appertains to make and use the same.

This invention relates to sockets for splicing ropes and cables.

The object of the invention is to provide means for connecting or splicing the ends of cables.

A further object of my invention is to provide a device for splicing power-transmitting cables which have been broken, so that said cables, which sometimes have to be discarded, can be repaired in a very few minutes, thereby losing but little time. This is of especial value in large mines, where loss of time means a loss of much money. Where it is possible to repair broken cables, provided they are of sufficient length, the ends are usually untwisted for considerable distance and a piece of cable is spliced in; but such an operation consumes the greater part of a day.

Another object of the invention is to provide a coupling for a cable of peculiar form that will pass readily through small openings and over small pulleys without catching or causing trouble.

In the accompanying drawings, Figure 1 is a side view of my splicing-socket combination, showing one of the sockets partly unscrewed and the other one partly broken away to show interior construction. Fig. 2 is a top view, partly in section, of parts of the sockets, showing a connecting-link, which is also shown in Fig. 1.

A A indicate the bodies of two socket portions of oval form, both having their ends cut squarely off in a plane at right angles to their axes. The said members A A have hollow interiors at B, the recess in each being gradually enlarged from their outer ends inward, as shown in section in Fig. 2. In the large end of the socket member is a threaded opening C, which receives a threaded member D, forming part of an eye E. This eye is provided with an aperture F, through which passes a ring G.

The entire device, it will be seen, comprises five parts—namely, the two socket members A A, the eyes E, having the threaded stems D, and the ring G. It is my design to connect both the said eyes E together by means of the ring, the latter being firmly welded together at its ends to make an unbreakable link connection.

In connecting the broken ends of a cable it is only necessary to untwist the ends for an inch or two after passing said end through the socket A from its small end and turn the strands back upon themselves. This makes an enlarged head on the cable's end, which when drawn back into the recess B wedges therein, and the end of the cable cannot be pulled out through the contracted end. Molten lead may be poured in around the head, thereby making a solid block; but the former method is preferable, since if the metal is not ready for use the connection can be made more quickly without it. After both ends of the cables are thus treated and seated in the recesses B the eyes are screwed into place. In order to accomplish the latter operation in the easiest and most effective manner, the stems D are provided with right and left hand threads—that is to say, one of them is given a right-hand and the other a left-hand thread—as shown in Fig. 1. Now by bringing the portions A A toward one another and placing the eyes E between them and entering their threaded stems D into the threaded openings C the threads are made to engage, and by turning the eyes in the proper direction the sockets are drawn tight up to the shoulders of the eyes. The connection is now complete except for entering a pin H through each socket and its complementary stem D and riveting both ends of the said pins, as shown in Fig. 1, at the right, it being understood that a hole J has previously been drilled through the parts for the reception of the pins, so that all will be in readiness for the splicing operation described.

It will be noted that the members E being flattened and tapered to a small end, as shown in Fig. 2, admit of the use of quite a small link, but a strong one, whose measurement is but little larger than the greatest diameter of the parts A, so that it will pass over a pulley or through an opening made to accommodate the said parts A.

The advantages in a device of this kind are at once apparent, and mine is especially convenient by reason of its construction and arrangement of parts.

I claim—

In a coupling of the class described the combination of a rope member tapered from one end to the other and having a partial longitudinal tapering bore the surface of which is substantially parallel with the tapering exterior of the member, the cable ends within said bore, said member at its small end being substantially the same diameter as the cable, there being a second straight bore within the larger end of the said rope member opening into the tapering bore and of considerably smaller diameter than the latter bore and provided with screw-threads, a link-carrying member having a body of the full diameter of the rope member and having a threaded extremity of reduced diameter to screw into the threaded bore of the said rope member, said body being flattened and tapered at two diametrically opposite sides beginning immediately at the first member as shown, there being a hole through the flat sides to form a closed eye, a second combined rope member and link-carrying member identical with those described, and a closed link for connecting the said link-carrying members, the shortest diameter of the link having a diameter substantially equal to the greatest diameter of the coupling members, and a pin extending through each extremity of the link-carrying members and the rope members as shown.

In testimony whereof I affix my signature in presence of two witnesses.

JAMES L. FRAZIER.

Witnesses:
E. J. ABERSOL,
L. M. THURLOW.